G. C. SALT.
CLUTCH CONTROL.
APPLICATION FILED SEPT. 5, 1916.
1,226,118.
Patented May 15, 1917.
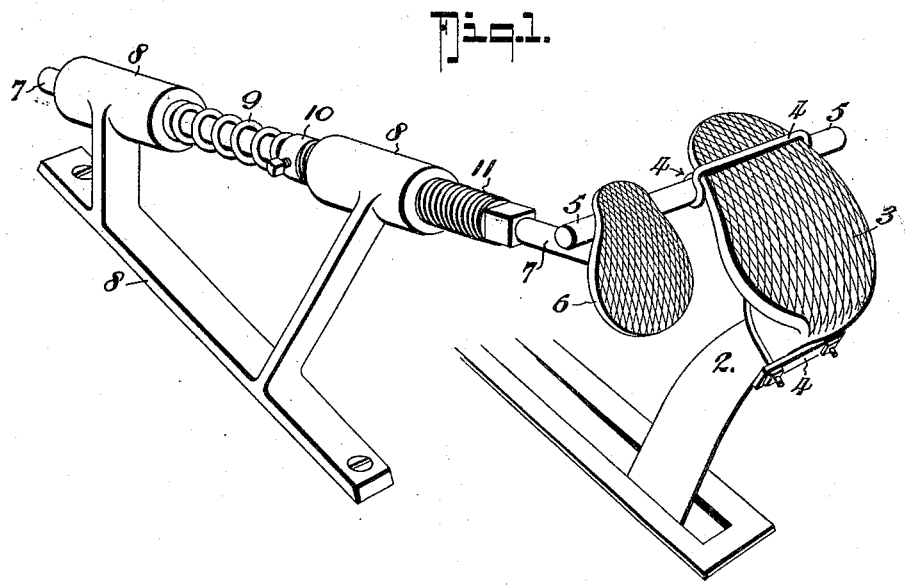
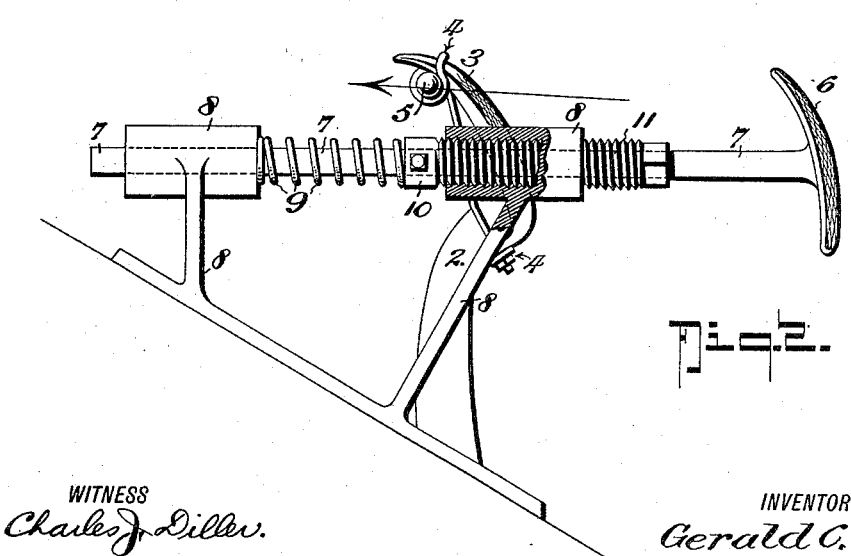
WITNESS
Charles J. Diller.
INVENTOR
Gerald C. Salt.
BY
Fred G. Dieterich
ATTORNEYS

UNITED STATES PATENT OFFICE.

GERALD C. SALT, OF VICTORIA, BRITISH COLUMBIA, CANADA.

CLUTCH CONTROL.

1,226,118.  Specification of Letters Patent.  Patented May 15, 1917.

Application filed September 5, 1916. Serial No. 118,480.

*To all whom it may concern:*

Be it known that I, GERALD C. SALT, a citizen of the Dominion of Canada, residing at Victoria, in the Province of British Columbia, Canada, have invented certain new and useful Improvements in Clutch Controls, of which the following is a specification.

This invention relates to a supplementary pedal for use with the clutch pedal of an automobile, to enable the clutch lever of the engine to be moved with definite certainty into the neutral position, and without the risk of inadvertently moving it into low gear.

A great deal of discomfort is experienced in driving a car owing to the uncertainty in moving the clutch pedal to the neutral position, and this discomfort is not only due to the uncertainty in locating the neutral position but to the risk of the engine stalling if the pedal lever is inadvertently moved too far and into low gear.

The invention, which is the subject of this application, is designed to provide a means whereby movement of the clutch lever is definitely stopped at the neutral position without interfering with the free movement of that lever into low gear, when required.

This means is fully described in the following specification, reference being made to the drawing by which it is accompanied, and in which Figure 1 is a perspective view of my invention in its normal position. Fig. 2 is a side elevation of the same, the clutch pedal being pushed past the auxiliary pedal into low gear position.

In this drawing 2 represents the upper end of the clutch lever where it projects through the foot board of the machine and is provided with a pedal 3. A rod 5 is by means of a clamp 4 secured to the forward side of the upper end of the pdeal 3, one end of which rod 5 projects beyond the side of the clutch pedal 3 into the path of a supplementary pedal 6 which is secured on a stem 7 to move in a plane parallel to the plane of movement of the clutch lever in the bearings of a bracket 8 secured to the foot board adjacent the clutch pedal. This supplementary pedal is normally held at the backward limit of its movement and in engagement with the rod 5 by a spring 9 coiled on the stem 7 between one of the bearings of the bracket 8 and a collar 10 secured on the stem, and movement of the stem 7 against the resistance of this spring is limited by an adjustable bearing bush 11 threaded into the back bearing of the bracket 8.

The pedal 6 is mounted close to the clutch lever pedal 3 so that the foot may readily be transferred from one to the other. The bushing 11 is adjusted to limit the endwise movement of the pedal 6 to what is sufficient only to carry the clutch lever 2 into the neutral position.

While driving the car the foot will normally rest on the supplementary pedal 6 and when it is desired to throw the engine into neutral it may with confidence be moved to the limit permitted by the stop bushing 11, as that bushing will be adjusted to permit the clutch lever to be moved only to the neutral position; but if it is required to throw the engine into low gear the foot will be transferred to the clutch pedal 3 which is free to move to the full limit, without interfering with the supplementary pedal 6, nor will that pedal interfere with the movement of 3.

The device is self-contained and can be readily applied to existing machines without alteration of existing parts. When not required to be used it does not interfere, as already explained, with the ordinary movement of the engine clutch lever.

Having now particularly described my invention, I hereby declare that what I claim as new and desire to be protected in by Letters Patent, is:

1. In a mechanism of the character stated, the combination with the clutch lever of an automobile; of a push device adapted to be coöperatively engaged with the clutch lever when said device is moved in one direction to impart a limited movement to the clutch lever, such clutch lever being independently movable through its normal range.

2. Means for imparting a limited movement to the clutch lever of an automobile, said means comprising a supplementary pedal having such limited movement, and means secured to the clutch pedal and projecting in the path of the supplementary pedal.

3. Means for imparting movement to the clutch lever of an automobile as far as the neutral position, said means comprising a supplementary pedal having such limited movement, and an attachment to the clutch lever projecting in the path of the supplementary pedal.

4. Means for imparting movement to the clutch lever of an automobile to the neutral position, said means comprising a supplementary pedal movable adjacent to the clutch lever in a plane parallel thereto, a member secured to the clutch lever and projecting therefrom in the path of the supplementary pedal, a spring normally maintaining the supplementary pedal at the backward limit of its movement, and means limiting movement of the supplementary pedal to that sufficient only to move the clutch lever into the neutral position.

In testimony whereof I affix my signature.

GERALD C. SALT.

Copies of this patent may be obtained for five cents each, by addressing the "Commissioner of Patents, Washington, D. C."